United States Patent [19]

Hammond

[11] 4,271,544
[45] Jun. 9, 1981

[54] ANIMAL COMMODE

[76] Inventor: Larry R. Hammond, 4053 Wallace St., Apt. #1, Riverside, Calif. 92509

[21] Appl. No.: 959,609

[22] Filed: Nov. 13, 1978

[51] Int. Cl.³ .................................................. A01K 1/01
[52] U.S. Cl. ............................................ 4/661; 4/238; 119/1
[58] Field of Search ................ 4/1, 239, 238, 241, 4/144, 661; 119/1

[56] References Cited

U.S. PATENT DOCUMENTS

| | | | |
|---|---|---|---|
| 1,006,812 | 10/1911 | Ward | 4/238 |
| 3,752,121 | 8/1973 | Brazzell | 119/1 |
| 3,757,738 | 9/1973 | Hall | 4/239 |
| 3,990,397 | 11/1976 | Lowe | 119/1 |
| 4,054,958 | 10/1977 | Widham | 4/238 |
| 4,080,968 | 3/1978 | Nielsen | 4/450 |

Primary Examiner—Lenard A. Footland

[57] ABSTRACT

A commode for animals comprising a base member having an opening formed therein, the opening surrounded by a box-like enclosure open at the top. The portion of the base interior to the enclosure is sloped downwardly toward the opening to aid an animal in correctly positioning itself over the slot. A part of the base, exterior to the enclosure, forms a platform which may be covered with a grass-like material. The opening may further include a mechanically operated trapdoor actuated by the weight of an animal positioning itself within the enclosure. The commode is mounted over a separate waste receiving tray or receptacle preferably containing an aqueous solution of a waste digesting-deodorizing chemical. It is also contemplated that the commode be removably mounted on a conventional toilet.

19 Claims, 7 Drawing Figures

ANIMAL COMMODE

BACKGROUND OF THE INVENTION

The invention relates to the field of animal waste disposal systems and more particularly, to an inexpensive and safe animal commode.

Various types of animal commodes have been proposed in the prior art. U.S. Pat. No. 3,990,397 to Lowe, Jr. shows a pet box for containing a dry absorbent material, such as cat litter, and having a detachable lid including a longitudinal waste receiving slot formed therein. It is also known to use a deodorized water solution in lieu of dry absorbent materials, which may be periodically drained, as shown in U.S. Pat. No. 3,762,369 to Barnum. It is also known to place such animal commode devices directly over a conventional toilet, rather than over a separate waste receiving box, for example, as shown in U.S. Pat. Nos. 3,990,397 (supra) and 3,757,738 to Hall. In order to increase the safety of an animal during use and to decrease the emission of malodorous fumes from waste deposited in toilet adapted animal commode devices, it has been proposed to include a pressure actuated, electrically controlled trap-door mechanism which allows the weight of an animal's body to operate the mechanism, as is shown in U.S. Pat. No. 3,656,457.

The present invention represents an improvement over the devices known in the art by providing a safe, relatively simple and sanitary animal commode which may be used either as an accessory to a conventional toilet or in combination with a chemical waste disposal material contained in a separate tray. In an embodiment of the invention, a simple and efficient mechanically operated trap-door mechanism is provided.

SUMMARY OF THE INVENTION

The disadvantage of prior art devices are overcome in the present invention wherein there is provided a commode for animals comprising a substantially flat base member having a generally rectangular opening formed therein, the opening is enclosed by an enclosure open at the top. The portion of the base or floor of the enclosure is sloped downwardly toward the opening to aid an animal in correctly positioning itself over the slot. The base member extends the portion of the base outwardly from the box-like enclosure to form a platform. In the preferred embodiment, the platform is covered by a fabric material of the type that cats like to scratch. An embodiment of the invention includes a spring loaded mechanical trap-door mechanism actuated by the weight of an animal present within the enclosure. The commode is mounted over a waste receiving separate tray or receptacle preferably containing a liquid waste-disposing chemical which also acts to deodorize and sanitize waste eliminated by an animal into the receptacle. The commode can be placed directly over a standard toilet facility through the use of spaced apart guiding means formed on the underside of the base member.

It will be understood from the more detailed descriptions hereafter that the present invention provides for a simple, practical and reliable mechanical activating mechanism for a normally closed trap-door mounted beneath the slot formed in the base member. Further, the provision of a waste receiving receptacle containing a liquid waste-disposal chemical makes disposal of the waste containing liquid quicker and more sanitary since the waste containing liquid may be readily flushed down a conventional toilet. The provision of a portable device which utilizes liquid chemical waste-disposal means is also considerably less expensive to the consumer than the commonly used dry absorbent-type litter, such as vermiculite or clay. Lastly, but extremely important, the present invention may be used directly over a conventional toilet through the provision of guiding means which allows the slotted base and enclosure to be placed directly over the rim of the toilet.

BRIEF DESCRIPTION OF THE DRAWINGS

These and other objects, features, and advantages of the present invention will be readily apparent from the following description of the preferred embodiment taken in conjunction with the appended claims and the accompanying drawing figures wherein:

DESCRIPTION OF THE PREFERRED EMBODIMENTS

Figure 2:
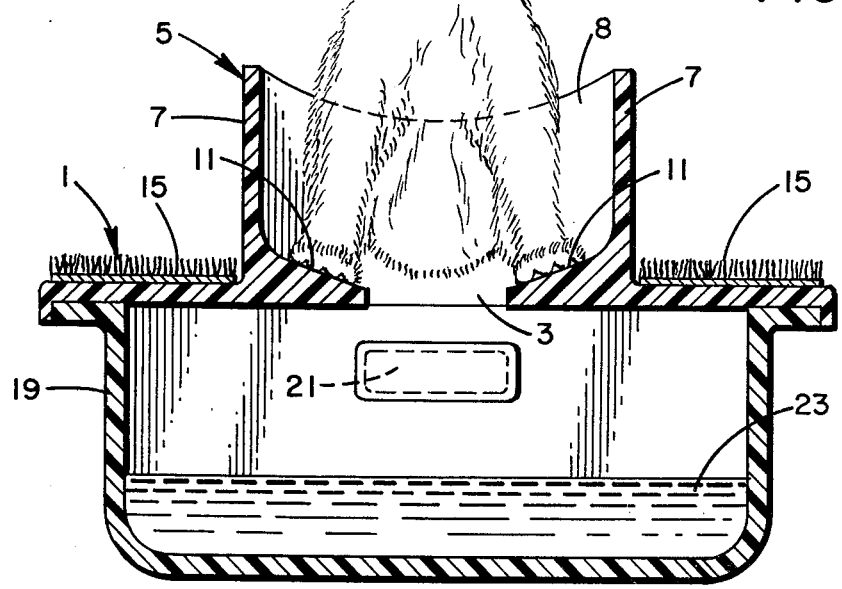
FIG. 2 is a sectional view of the animal commode shown in FIG. 1 taken along line 2—2 of that FIGURE.

Referring to the drawings in which like parts have the same number, there is shown an animal commode comprising a generally flat base member 1 having a generally longitudinal opening or slot 3 formed therein. A generally rectangular box-like enclosure 5, open at the top is integrally mounted on base member 1 in such manner as to surround opening 3. Enclosure 5 comprises side walls 7 and front and rear walls 8. The floor or platform portion 11 of side walls 7 slopes downward toward opening 3 at an angle, such that an animal standing thereon braces its feet against slipping into the opening as seen in FIG. 2. In the preferred embodiment, inclined surface 11 has an angle of inclination to the horizontal in the range of about 5 degrees to 20 degrees. It was discovered that animals adapted to the commode more quickly, and had fewer accidents, when the floor of the apparatus on which the animal stands to defecate is inclined as seen in FIG. 2.

Exterior platform portions 15 of base member 1 act as a step-up or step-down aid for an animal as it enters or exits enclosure 5. In the preferred embodiment platform, platform 15 is provided with a covering of the type cats enjoy scratching, such as artificial turf or carpeting. Such a covering allows an animal, especially a cat, to release its natural pawing or covering instincts before and after it has used the animal commode. While the commode of the invention may be constructed of, for example, wood, metal, plastic, or other materials, in the preferred embodiment, the commode is molded out of a rigid plastic material for ease of cleaning and handling.

Figure 1:
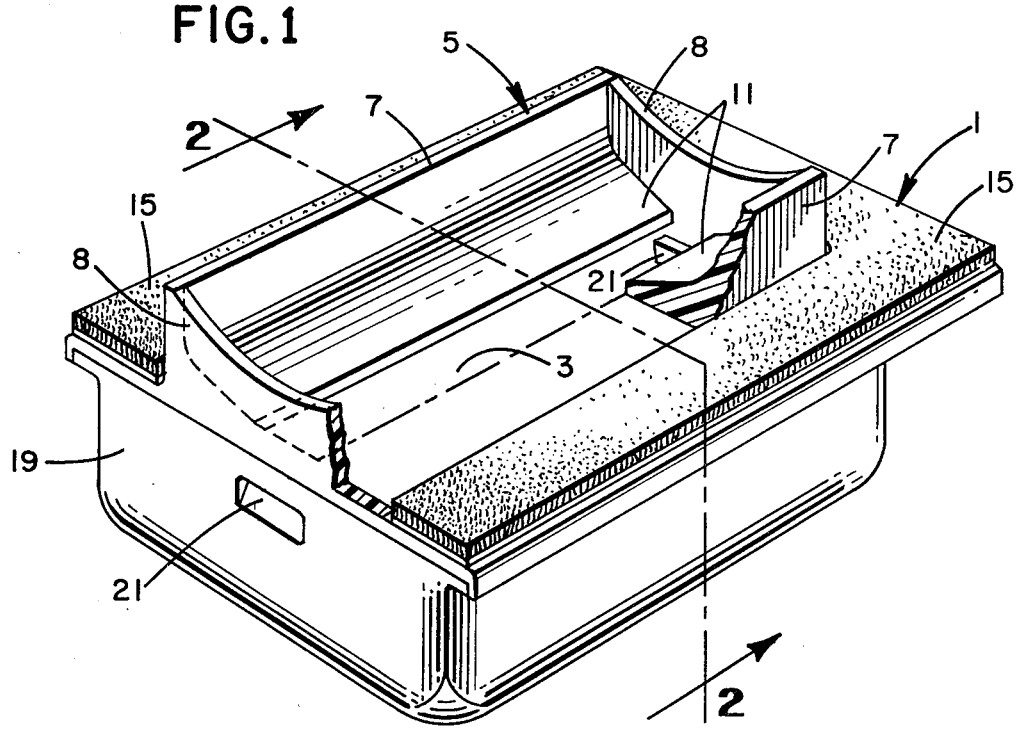
FIG. 1 is a partially broken away perspective view of one embodiment of the present invention.

In the illustrated embodiments of FIG. 1, base platform 15 is shown extending outwardly on three sides. In the other drawings, extensions 15 are shown as extending outwardly from two sides. It will be understood that construction is contemplated whereby extension 15 may be also on one, or all four sides of the enclosure also.

Figure 4:
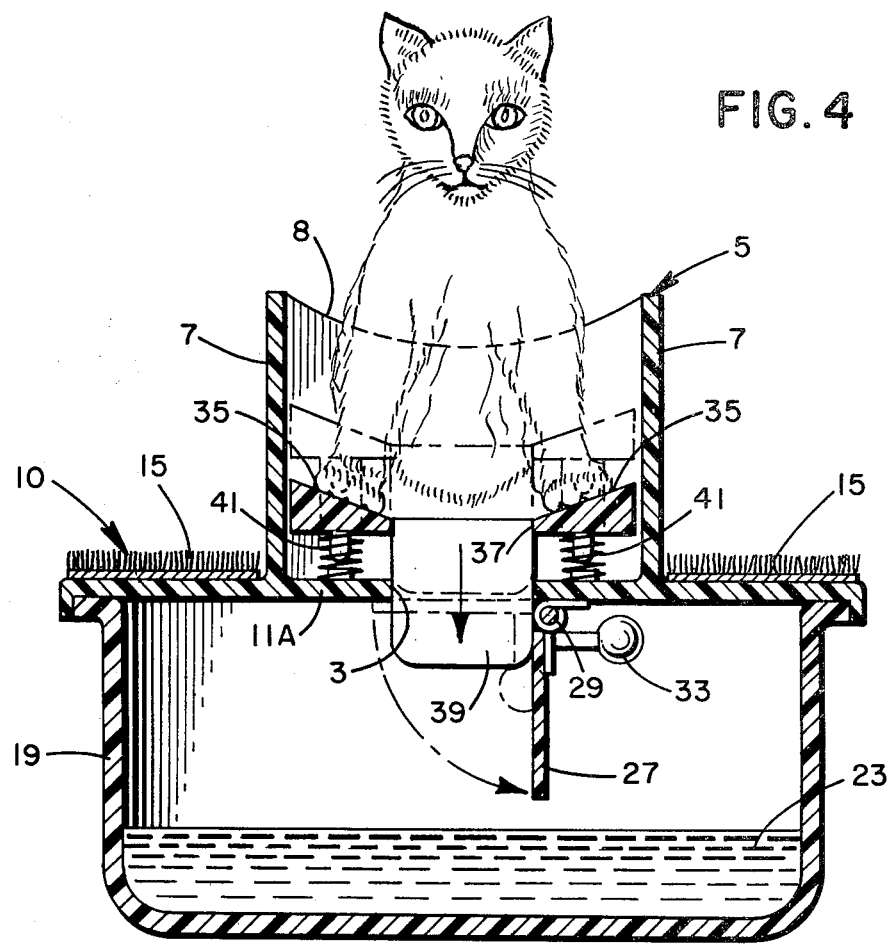
FIG. 4 is a vertical sectional view of a second embodiment of the invention showing a trap-door mechanism.

As illustrated in FIGS. 1, 2, and 4, the commode is shown to be removably mounted over a generally rectangular waste receiving tray or receptacle means 19. Receptacle 19 is provided with a pair of handles 21 formed on opposite sides of the receptacle to aid in carrying the complete unit.

In the preferred embodiment of the invention, an aqueous, or other liquid, solution of a digesting-deodorizing material is used in the waste receiving receptacle. It will be appreciated that any of the known enzyme containing, non-toxic waste disposing chemicals would be advantageous in the operation of the inventive device. In operation, a digesting-deodorizing material 23 is placed in the receptacle 19 or added to the water in a toilet when used. Granulated absorbent materials such as clay or "Kitty-Litter" may also be used in the invention as a deodorizing material. As mentioned before, the use of a liquid waste disposing material is advantageous by permitting simple disposal of the waste material by flushing it down a toilet.

In another preferred embodiment of the invention, and as illustrated in FIG. 1, the front and rear walls 8 of enclosure 5 are lower than the side walls to facilitate entry of the animal.

Figure 3:
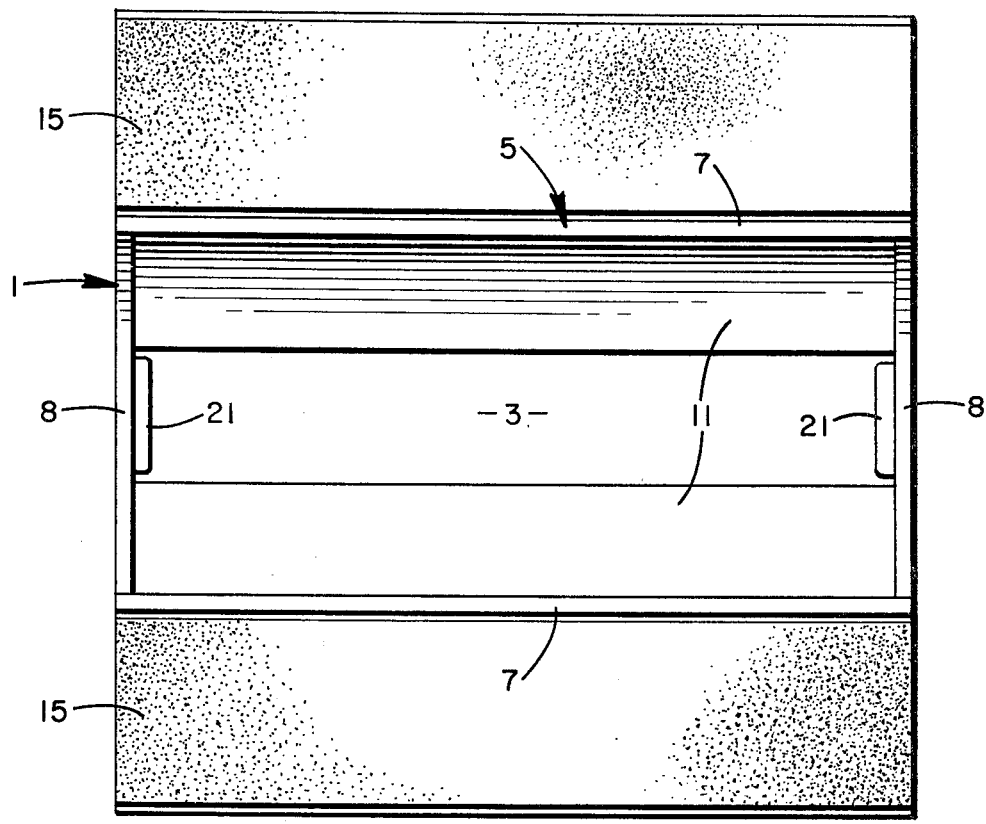
FIG. 3 is a top plan view of the animal commode shown in FIG. 1.

FIGS. 2 and 3 illustrate how the sloped base portion 11 of interior side walls 7 adjacent to opening 3 aid an animal in properly positioning itself over the opening. It was found that an animal adapts to the utility of the commode quite readily when its paws are on the relatively narrow sloped wall portion 11 adjacent to the opening 3. The cut out portion of back and front walls 8 facilitates the entrance and exit of the animal while establishing a familiar route for the animal to and from the enclosure.

Figure 6:
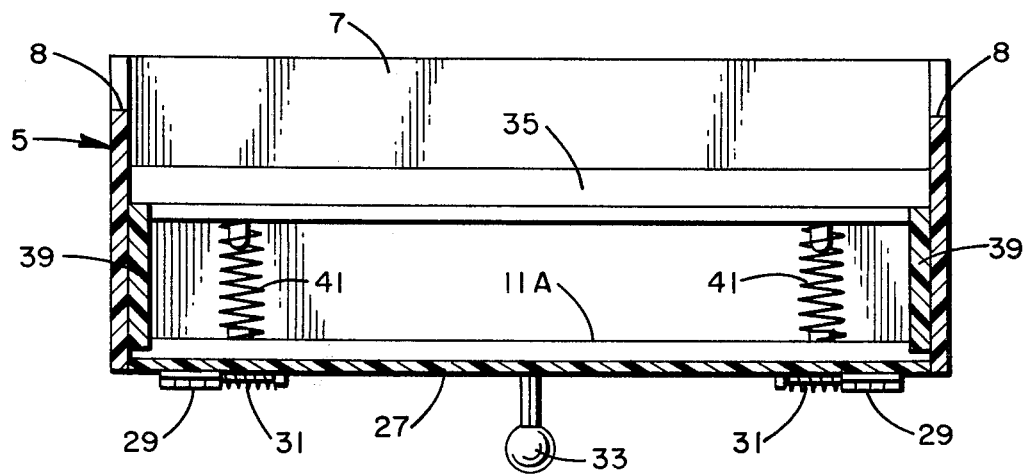
FIG. 6 is a vertical longitudinal sectional view taken along line 6—6 of FIG. 5, with receptacle omitted for simplicity.
Figure 5:
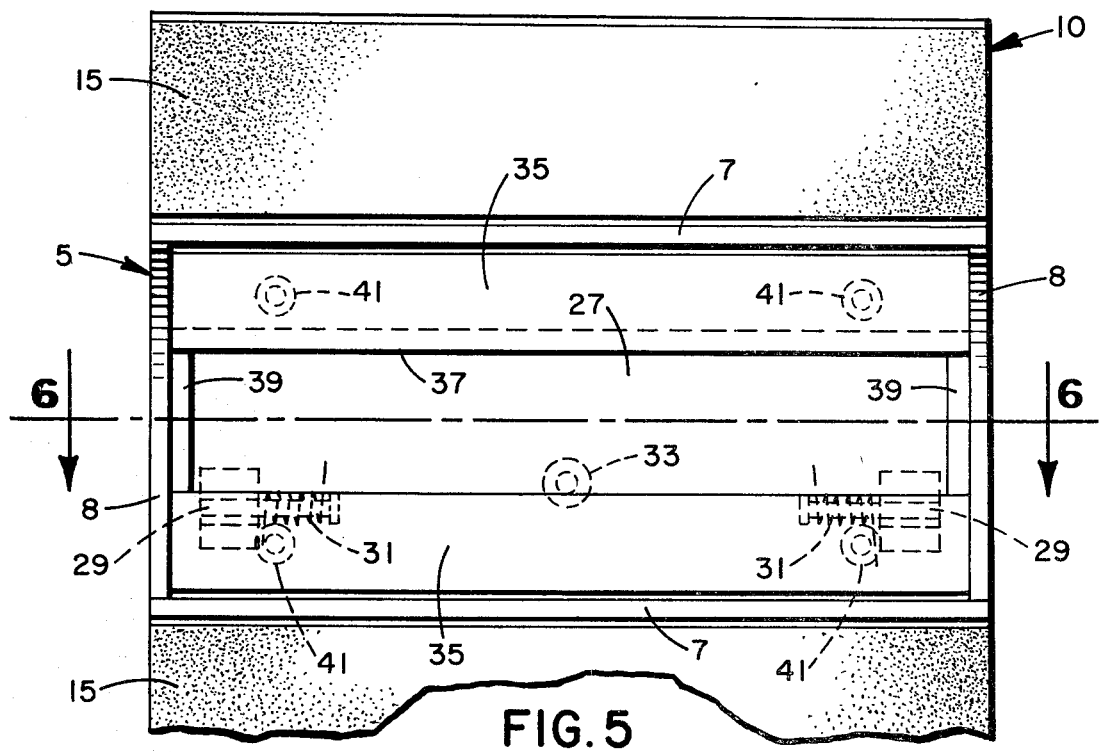
FIG. 5 is a top plan view of the embodiment shown in FIG. 4.

A modified commode 10 is shown in FIGS. 4, 5 and 6, trap-door 27 means are shown which are designed to close off opening 3 when the commode is not in use. As shown in the drawings, trap-door means 27 comprise hinge means 29 mounted on one edge of opening 3, spring means 31 and counterweight member 33. In the illustrated embodiment, trap-door 27 closes off opening 3 by means of springs 31 and counterweight 33. The trap-door actuating mechanism comprises floor or platform member 35 conforming in general to the sloped floor portions 11 of FIG. 2 and having a central slot opening 37 therein conforming generally in dimension and shape to opening 3 in the base member 10 having a pair of trap opening pusher plates 39 mounted at either end of platform plate 35 and spring supporting means 41. Platform member 35 is mounted and held above base portion 11A by means of spring members 41 mounted on the underside of platform 35 and supported by base 11A.

In operation, wire springs 31 and counterweights 33 act to bias trap-door 27 upwardly against slot 3. When an animal enters enclosure 5, it stands on actuator platform 35. The weight of the animal forces platform 35 downwardly against the resistance of springs 41. As platform 35 moves downwardly, pusher plates 39 mounted on platform 35 engage trap-door 27, pushing the trap-door downwardly and open. After the animal completes his tasks and leaves the enclosure, springs 41 bias plate 35 upwardly removing the downward push of pusher plates 39. Counterweight 33 and springs 31 attached to trap-door 27 simultaneously act to close the trap-door. It will be appreciated that the invention provides an extremely simple, practical and reliable mechanism which is operable to open a trap-door when actuated by an animal's weight and which automatically closes the trap-door when the weight of an animal is removed. It is to be understood that either spring means 31 or counterweight 3 may be used alone to close trap-door 27.

Figure 7:
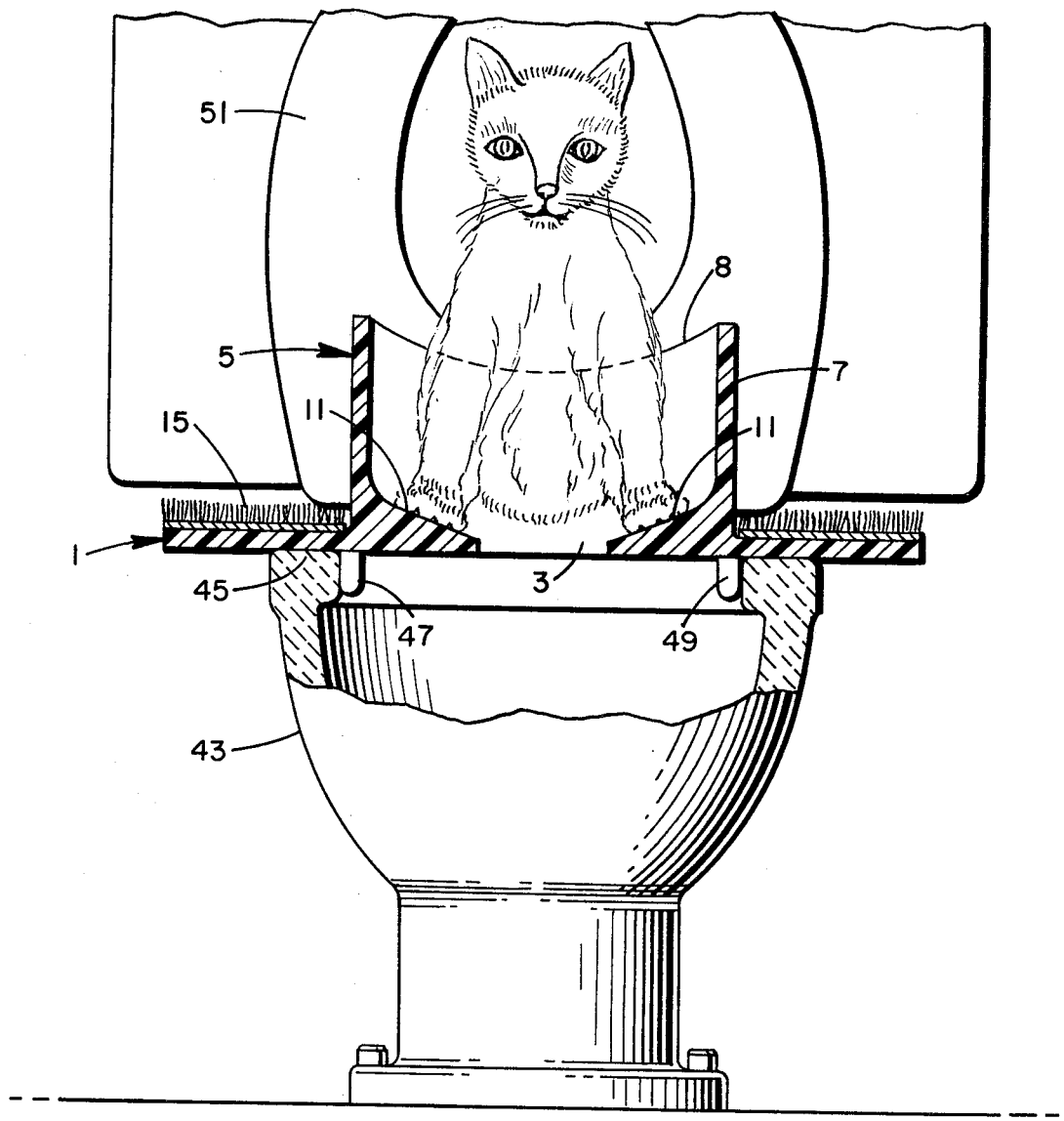
FIG. 7 is a sectional view of a modified embodiment of the invention as shown in FIGS. 1-3, for use with a conventional toilet.

Referring now to FIG. 7, there is shown an alternative embodiment of the invention wherein the commode of the invention may be directly mounted on the bowl of a conventional toilet 43. In contrast to prior art devices which require special mountings or which fit directly over the seat 51 of the toilet, the present invention allows mounting of base 1 directly on the rim 45 of toilet 43 through the use of spaced apart guiding means 47 and 49. Guiding means 47 and 49 preferably comprise projecting finger members, for example, dowels affixed to the underside of base member 1 and spaced apart a sufficient distance so as to approximate the inner rim 45 of toilet 43. In this manner, waste material eliminated by an animal into the toilet bowl may be readily disposed by flushing toilet 43. Since seat 51 can be raised and the base member and enclosure device is removable and storable on its end, near the toilet 43, the animal commode is kept relatively sanitary compared to prior art devices which are permanently mounted on the toilet.

The various parts which form the base, enclosure, trap-door mechanism, and receptacle portions of the present invention can be formed from many types of materials, such as plastics or metals, using techniques well-known in the art. It will be appreciated that since the commode is readily removable from receptacle 19 or alternatively, toilet 43, that cleaning the various components comprising the present invention is made very simple. It will be also understood that the enclosure member of the commode may be circular.

While the animal commode of the present invention has been described in considerable detail, it is understood that various changes and modifications may occur to persons of ordinary skill in the art without departing from the spirit and scope of the invention as is defined in the appended claims.

What is claimed is:

1. An animal commode comprising:
 a base member adapted to be removably mounted on a waste-receiving receptacle;
 an opening in said base member communicating with said receptacle;
 an enclosure open at the top integrally mounted on said base member, said enclosure extending upwardly from said base member and enclosing said opening;
 a floor member sloped to the edge of said opening;
 generally flat platform extensions integrally connected to said base member and extending laterally outwardly therefrom and from said upwardly extending enclosure to an extent to provide a step for the animal; and
 material of the type cats like to scratch covering said platform extensions exterior to said enclosure, whereby the usual scratching by the animal, after excreting, takes place on the flat platform extensions outside the enclosure, rather than inside the enclosure, to thereby enhance the sanitary conditions of the commode.

2. The animal commode of claim 1 wherein at least one portion of said enclosure wall is of lower height than the remaining portion of the walls to facilitate entrance and exit by the animal.

3. The animal commode of claim 1 wherein said floor portion is sloped to the edge of said opening at an angle within the range of about 5 degrees to 20 degrees with respect to the horizontal.

4. The animal commode of claim 1 wherein said receptacle means comprises a container adapted to contain a liquid waste disposal and deodorizing material.

5. The animal commode of claim 4 wherein said container includes a pair of handles disposed on opposite ends of said container.

6. An animal commode comprising:
a base member adapted to be removably mounted on a waste-receiving receptacle;
an opening formed in said base member communicating with said waste receptacle;
an enclosure open at the top integrally mounted on said base member and enclosing said opening;
a floor member in said enclosure sloped to the edge of said opening, generally flat platform extensions associated with said base member exterior to said enclosure
a trap-door assembly for said opening including a trap-door and trap-door actuating means for operating said trap-door operable by the weight of an animal on said floor member; and
receptacle means, having said base member and enclosure removably mounted thereon for receiving animal waste from an animal disposed within said enclosure over said opening.

7. The animal commode of claim 6 wherein said trap-door actuating means comprises spring means and a pusher plate means mounted on said floor member adapted to push open said trap-door when said spring means are depressed by a downward force on said floor means.

8. The animal commode of claim 7 wherein said floor member slopes at an angle within the range of about 5 degrees to 20 degrees with respect to the horizontal toward the opening therein.

9. The animal commode of claim 6 wherein said trap-door assembly comprises:

a trap-door disposed below said opening in said base member and hingedly connected to one edge of said opening;
means for biasing said trap-door to a closed position;
spring means disposed between said floor member and said base member to bias said floor member upwardly in a spaced-apart relationship from said; base and downwardly projecting pusher means mounted on said floor member cooperating with said trapdoor to cause said trap-door to swing open when downward pressure is applied by the weight of an animal standing on said floor member.

10. The animal commode of claim 9 wherein said trap-door assembly includes spring biasing means for maintaining said trap-door in a closed relationship with said opening.

11. The animal commode of claim 9 wherein a counter-weight mounted on said trap-door maintains said trap-door in a closed position with respect to the opening in said base.

12. The animal commode of claim 9 wherein said trap-door comprises spring means and a counter-weight means connected with the trap-door whereby said trap-door is maintained in a closed position with respect to the opening in said base.

13. The animal commode of claim 6 wherein said platform extensions exterior to said enclosure are covered with a material of the type cats like to scratch.

14. The animal commode of claim 6 wherein a portion of said enclosure wall is of lower height than the remaining enclosure to facilitate entrance and exit by the animal.

15. The animal commode of claim 6 wherein said receptacle means is a toilet.

16. The animal commode of claim 15 wherein said base member includes a pair of spaced-apart guide means mounted thereon for removably mounting said base member on said toilet.

17. The animal commode of claim 16 wherein said guide means comprises a pair of dowels mounted beneath said base member and spaced sufficiently apart so as to engage the inner rim of a toilet upon which said base member is to be mounted.

18. The animal commode of claim 6 wherein said receptacle means comprises a generally rectangular tray of similar dimensions as said base member.

19. The animal commode of claim 18 wherein said tray includes a pair of handles disposed on opposite ends of said tray.

* * * * *